United States Patent
Kang et al.

(10) Patent No.: US 7,473,153 B2
(45) Date of Patent: Jan. 6, 2009

(54) PROCESS FOR FABRICATING A FIELD EMITTER ELECTRODE WITH CARBON NANOTUBES

(75) Inventors: Hyoung Dong Kang, Suwon (KR); Hyun Chul Jung, Suwon (KR); Sang Moon Lee, Seoul (KR); Jong Myeon Lee, Seoul (KR)

(73) Assignee: Samsung Electro-Mechanics Co., Ltd., Kyungki-Do (KR)

( * ) Notice: Subject to any disclaimer, the term of this patent is extended or adjusted under 35 U.S.C. 154(b) by 435 days.

(21) Appl. No.: 11/064,966

(22) Filed: Feb. 25, 2005

(65) Prior Publication Data

US 2006/0063464 A1 Mar. 23, 2006

(30) Foreign Application Priority Data

Sep. 14, 2004 (KR) ............. 10-2004-0073559

(51) Int. Cl.
*H01J 9/24* (2006.01)
(52) U.S. Cl. ........................................ 445/50
(58) Field of Classification Search .......... 445/23–25, 445/49–51
See application file for complete search history.

(56) References Cited

U.S. PATENT DOCUMENTS 6,616,497 B1 * 9/2003 Choi et al. ............... 445/24
7,273,661 B2 * 9/2007 Moriyama et al. ....... 428/473.5
2006/0057927 A1 * 3/2006 Kang et al. ............... 445/46

FOREIGN PATENT DOCUMENTS

| EP | 1061555 A1 | 12/2000 |
|----|------------|---------|
| JP | 2000-90809 A | 3/2000 |
| JP | 2000-277002 A | 10/2000 |
| JP | 2002-8517 A | 1/2002 |
| JP | 2003-257304 A | 9/2003 |
| KR | 2001-39637 | 5/2001 |
| KR | 2003-33244 | 5/2003 |
| KR | 2004-66270 | 7/2004 |
| WO | 03004741 A1 | 1/2003 |
| WO | 03/084865 | 10/2003 |

OTHER PUBLICATIONS

Chinese Intellectual Property Office, Office Action mailed Apr. 4, 2008 and English Translation; Notification of the First Office Action.

* cited by examiner

*Primary Examiner*—Joseph L Williams
(74) *Attorney, Agent, or Firm*—Lowe Hauptman Ham & Berner

(57) ABSTRACT

A process for fabricating a field emitter electrode includes: impregnating a cathode and anode in an electrolyte containing carbon nanotubes dispersed therein and applying a predetermined voltage to the cathode and anode so as to deposit carbon nanotubes on a substrate provided on the anode; recovering the substrate and applying a conductive polymer onto the surface of the substrate having carbon nanotubes deposited thereon; and heat treating the conductive polymer having carbon nanotubes deposited thereon, so as to completely cure it.

19 Claims, 3 Drawing Sheets

_(1)_

PROCESS FOR FABRICATING A FIELD EMITTER ELECTRODE WITH CARBON NANOTUBES

The present application is based on, and claims priority from, Korean Application Number 2004-73559, filed Sep. 14, 2004, the disclosure of which is incorporated by reference herein in its entirety.

BACKGROUND OF THE INVENTION

1. Field of the Invention

The present invention relates to a process for fabricating a field emitter electrode, and more particularly to a novel process for fabricating a field emitter electrode in which low bond strength of carbon nanotubes, a disadvantage exhibited in a conventional electrophoretic method, is improved.

2. Description of the Related Art

Generally, a field emission device is a light source based on electron emission in vacuum and refers to an element emitting light according to the principle by which electrons emitted from micro particles are accelerated by a strong electric field to impinge upon fluorescent materials. The above-mentioned field emission device has advantages such as excellent light emitting efficiency and capability of realizing light-weight and compactness as compared to conventional illumination light sources such as an incandescent bulb, as well as environmental friendliness due to no use of heavy metals unlike fluorescent lamps and therefore has received a great deal of attention as a next generation light source for use in a variety of illumination fields and displays.

The performance of the field emission device significantly depends on the emitter electrode's capability to emit an electric field. Recently, carbon nanotubes (CNT) have been actively used as the electron emitting material for the emitter electrode having excellent electron emission characteristics.

However, it is difficult to uniformly grow carbon nanotubes on a large area substrate, and thus a process involving purifying carbon nanotubes grown by a separate process and depositing them on the substrate is generally used. Examples of representative methods for fabricating the carbon nanotube emitter electrode include typical printing method and electrophoretic methods.

Fabricating the carbon nanotube emitter electrode by the conventional printing method is performed by coating an electrode layer on a flat-surfaced substrate, and printing paste made of carbon nanotubes and silver powder on the electrode layer. This is followed by removing resin and solvent contained in the paste through a heat treatment process and exposing a portion of carbon nanotubes from the surface of the cured layer using a tape method.

However, this method has disadvantages such as being a complicated process, and having difficulty in obtaining homogeneous dispersion of carbon nanotubes, and thereby characteristics of the field emitter electrode may be deteriorated. Further, there is another problem in obtaining sufficient physical/mechanical bonding between carbon nanotubes and lower electrode materials using known paste application processes.

Alternatively, the method for fabricating the carbon nanotube emitter electrode by electrophoresis is performed by mixing previously purified carbon nanotubes (CNT) with a dispersing agent (for example, cationic dispersing agent) in an electrolyte 14, and then applying voltage to both electrodes 16 and 17 dipped in the electrolyte 14, thereby depositing carbon nanotubes (CNT) on the substrate 11 provided on the anode 16, as shown in FIG. 1.

This method using electrophoresis can realize relatively homogeneous dispersion of carbon nanotubes and simplification of the overall process, but has a problem in that it is not suitable for an apparatus requiring a long service life due to low mechanical impact resistance resulting from weak bond strength of carbon nanotubes.

SUMMARY OF THE INVENTION

Therefore, the present invention has been made in view of the above problems, and it is an object of the present invention to provide a process for fabricating a field emitter electrode having improved bond strength of carbon nanotubes and improved electrical characteristics, by applying a conductive polymer to carbon nanotubes that are deposited on a substrate by an electrophoretic method.

It is another object of the present invention to provide a process for fabricating a field emitter electrode having improved bond strength of carbon nanotubes and improved electrical characteristics, by forming a semi-cured conductive polymer layer and depositing carbon nanotubes on the conductive polymer layer via an electrophoretic method.

In accordance with the present invention, the above and other objects can be accomplished by the provision of a process for fabricating a field emitter electrode, comprising impregnating a cathode and anode in an electrolyte containing carbon nanotubes dispersed therein and applying a predetermined voltage to the cathode and anode so as to deposit carbon nanotubes on a substrate provided on either of two electrodes; recovering the substrate and applying a conductive polymer onto the surface of the substrate having carbon nanotubes deposited thereon; and heat treating them so as to cure the conductive polymer.

Preferably, carbon nanotubes have a length of 1 to 2 μm, and the conductive polymer layer is applied to have a thickness of about 0.2 to 1 μm.

The conductive polymer may be selected from the group consisting of polypyrrol, polyaniline, poly(3,4-ethylenedioxythiophene), polyacetylene, poly(p-phenylene), polythiophene, poly(p-phenylenevinylene) and poly(thienylene vinylene), but is not limited thereto.

Application of the conductive polymer may be performed by a process selected from the group consisting of spin coating, spray coating, screen printing and ink jet printing. Preferably, the spin coating process may be used.

In a specific embodiment of the present invention, a dispersing agent may be additionally added to the electrolyte in which carbon nanotubes were dispersed. The dispersing agent may be cationic dispersing agents such as benzene konium chloride, polyethyleneimine and magnesium chloride (MgCl$_2$), or anionic dispersing agents such as sodium dodecyl sulfate. Preferably, the dispersing agent is added in an amount of about 100 wt % to about 500 wt % relative to the amount of carbon nanotubes.

In addition, in order to more homogeneously disperse carbon nanotubes in the electrolyte, application of ultrasonic waves to the electrolyte in which carbon nanotubes were dispersed, may be additionally performed, prior to the step of depositing carbon nanotubes.

If necessary, the process in accordance with the present invention may further comprise etching the surface of the conductive polymer layer so as to sufficiently expose carbon nanotubes.

Further, the present invention provides a process for fabricating another type of a field emitter electrode. The process comprises applying a conductive polymer on a substrate; semi-curing the conductive polymer such that the applied conductive polymer forms a non-flowable polymer layer maintainable on the substrate; depositing carbon nanotubes on the conductive polymer of the substrate by electrophoresis; and heat treating the conductive polymer having carbon nanotubes deposited thereon, so as to completely cure it.

In this embodiment, the conductive polymer is preferably applied to a thickness of 0.5 to 2 µm.

Preferably, the process may further comprise separating the non-flowable conductive polymer layer from the substrate, after the semi-curing step, wherein the step of depositing carbon nanotubes may be accomplished by connecting the conductive polymer layer to an anode (only applicable to the case in which a cationic dispersing agent is used) and impregnating it with a cathode in the electrolyte in which carbon nanotubes were dispersed, and then applying a predetermined voltage to both electrodes so as to deposit carbon nanotubes on the conductive polymer layer.

In this embodiment, the step of semi-curing the conductive polymer may be carried out by heat treating the conductive polymer at a temperature of 50 to 100° C. for 5 to 30 min.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

The present invention will now be described in more detail with reference to the accompanying drawings.

FIGS. 2a through 2d are schematic diagrams illustrating a process for preparing a field emitter electrode in accordance with one embodiment of the present invention.

Figure 2A:
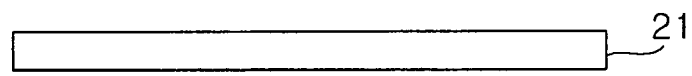
FIG. 2 is a schematic diagram illustrating a process for preparing a field emitter electrode in accordance with one embodiment of the present invention.

First, as shown in FIG. 2a, the process for preparing a field emitter electrode is initiated by providing a substrate 21. Since carbon nanotubes should be deposited on the substrate 21 by electrophoresis, a conductive substrate is used. Preferably, the substrate 21 is treated to have a clean surface by acid-cleaning and washing.

Figure 1:
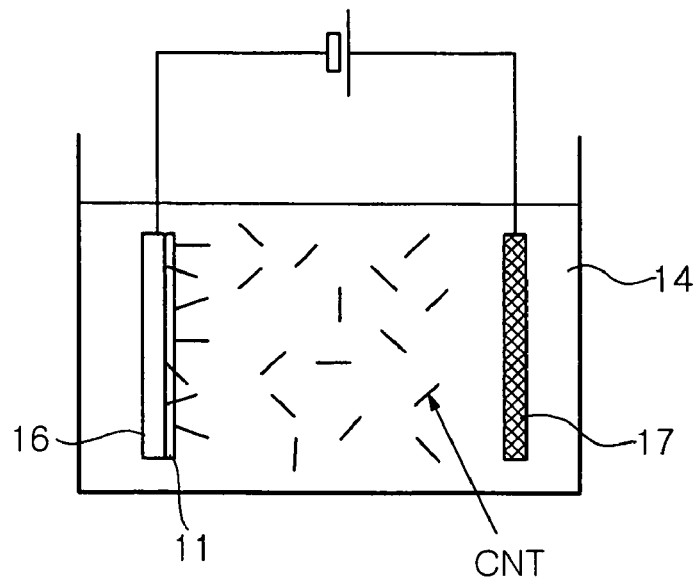
FIG. 1 is a schematic diagram showing an electrochemical polymerization process employed in a process for preparing a field emitter electrode using a conventional electrophoretic method.
Figure 2B:
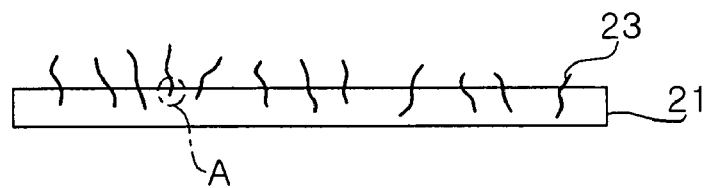

Next, as shown in FIG. 2b, carbon nanotubes 23 are deposited on the substrate 21 by way of a conventional electrophoretic method shown in FIG. 1. Carbon nanotubes 23 can be obtained by grinding multi-wall or single wall carbon nanotubes prepared using CVD or arc-discharge and then purifying them using known processes such as field flux flow separation. Preferably, carbon nanotubes used in the present invention have a length of about 1 to about 2 µm.

Carbon nanotubes are mixed and dispersed in an electrolyte used in the electrophoresis of this process. In order to improve homogeneous dispersion effects of carbon nanotubes, a dispersing agent may be added or ultrasonic waves can be applied. As the dispersing agent, cationic dispersing agents such as benzene konium chloride, polyethyleneimine and magnesium chloride ($MgCl_2$), or anionic dispersing agents such as sodium dodecyl sulfate may be used. Depending on the choice of dispersing agents, the electrode (cathode or anode) on which carbon nanotubes are deposited, is determined. Preferably, the dispersing agent is added in the amount of 100 wt % to 500 wt % relative to the weight of carbon nanotubes.

In the step of depositing carbon nanotubes 23 by electrophoresis, carbon nanotubes may not be deposited firmly, thus failing to have sufficient strength. For example, a portion of carbon nanotubes 23 may not be deposited firmly, failing to be fixed securely, as represented by "A", and thereby such carbon nanotubes 23 are weak and brittle to mechanical impact resulting in deterioration of product performance.

Figure 2C:
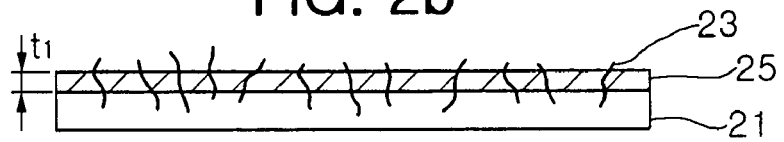

In this embodiment, in order to simultaneously, prevent such defective depositions and improve electrical characteristics, a process as shown in FIG. 2c is applied. That is, as shown in FIG. 2c, an application process of the conductive polymer 25 is performed on a substrate 21 on which carbon nanotubes 23 were deposited by electrophoresis.

The application thickness t1 of the conductive polymer 25 ranges from about 0.2 to about 1 µm such that carbon nanotubes can be suitably exposed through the applied surface. This is because if the thickness t1 of the applied conductive polymer 25 is less than 0.2 µm, the bond strength reinforcing effect is weak, while if t1 exceeds 1 µm, carbon nanotubes may not be suitably exposed. This application process may be performed by spin coating, spray coating, screen printing or ink jet printing. The conductive polymer 25 used in the present invention can be selected from the group consisting of polypyrrol, polyaniline, poly(3,4-ethylenedioxythiophene), polyacetylene, poly(p-phenylene), polythiophene, poly(p-phenylenevinylene) and poly(thienylene vinylene), but is not limited thereto.

Figure 2D:
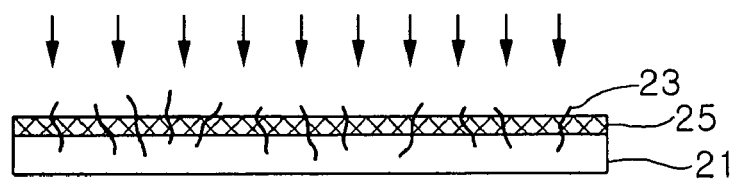

Finally, as shown in FIG. 2d, the applied conductive polymer 25 is heat treated to form a cured conductive polymer layer 25'. Although the temperature for heat treatment in this process varies depending on the kinds of the polymer used, heat treatment may be performed at a temperature ranging from about 150 to about 200° C. The cured conductive polymer layer 25' can not only reinforce deposition states of carbon nanotubes 23, but also electrically connect carbon nanotubes 23 thereby ensuring sufficient contact area between carbon nanotubes 23 and electrodes (not shown) to be provided from a field emission device. After this process, an additional process of etching the surface of the conductive polymer layer 25' may be performed such that carbon nanotubes 23 can be sufficiently exposed.

Although this embodiment is illustrated in the manner of applying the conductive polymer after depositing carbon nanotubes on the substrate, the present invention may also be realized by depositing carbon nanotubes on the substrate after the conductive polymer was previously applied. The process for fabricating the field emitter electrode in accordance with another embodiment of the present invention is shown in FIGS. 3a through 3e.

Figure 3A:
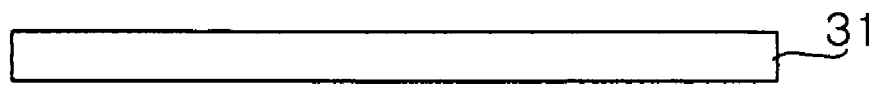
FIG. 3 is a schematic diagram illustrating a process for preparing a field emitter electrode in accordance with another embodiment of the present invention.

First, as shown in FIG. 3a, the process is initiated by providing a substrate 31. In this embodiment, since the conductive polymer layer is formed prior to a deposition process of carbon nanotubes, it is possible to perform electrophoresis by directly connecting the anode to the conductive polymer layer. Therefore, the substrate 31 is not particularly limited to the conductive substrate, unlike the above-mentioned embodiment.

Figure 3B:
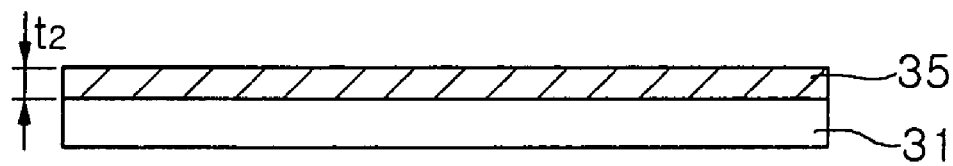

Then, as shown in FIG. 3b, a process of applying the conductive polymer 35 on the substrate 31 is performed. This application process may be performed by spin coating, spray coating, screen printing or ink jet printing. The conductive polymer 35 may be selected from the group consisting of polypyrrol, polyaniline, poly(3,4-ethylenedioxythiophene), polyacetylene, poly(p-phenylene), polythiophene, poly(p-phenylenevinylene) and poly(thienylene vinylene), but is not limited thereto.

In this connection, the application thickness t2 of the conductive polymer 35 preferably has a relatively large thickness since a part on which carbon nanotubes are deposited is the conductive polymer in a subsequent process, unlike the previous embodiment. The preferred application thickness t2 may be 0.5 to about 2 µm.

Figure 3C:
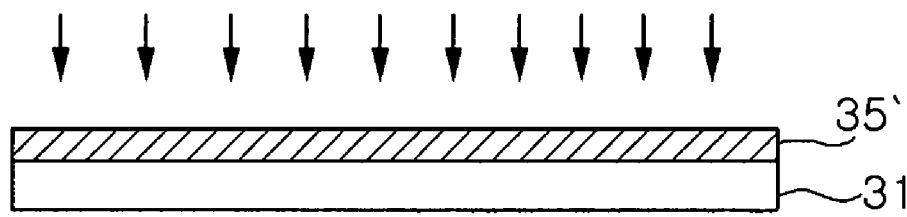

Next, as shown in FIG. 3c, the conductive polymer 35 was heat treated at a temperature below the curing temperature to form the non-flowable conductive polymer layer 35'. Carbon nanotubes are effectively deposited on the conductive polymer layer 35' through this process while at the same time, imparting suitable non-flowability by which deformation does not occur in a deposition process of carbon nanotubes by electrophoresis. Heat treatment for semi-curing is preferably performed at a temperature of 50 to 100° C. for 5 to 30 min, although there is no particular limitation to heat treatment conditions.

Figure 3D:
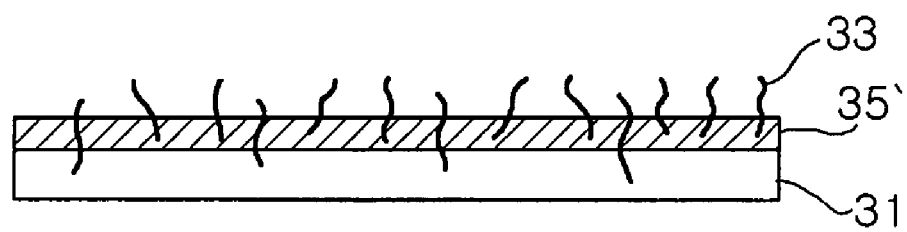
Figure 3E:
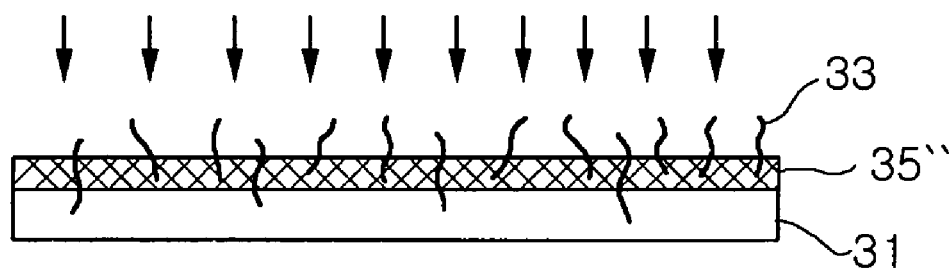

Next, as shown in FIG. 3d, carbon nanotubes 33 are deposited on the conductive polymer layer 35' by the process similar to the conventional electrophoretic method. Alternatively, prior to this process, the deposition process of carbon nanotubes may be performed by separating the semi-cured conductive polymer layer 35' from the substrate 31 and connecting only the conductive polymer layer 35' to the anode, even though the substrate 31 having the conductive polymer layer 35' formed thereon was illustrated in this embodiment. In this case, since the finished emitter electrode is provided in the form of the conductive polymer layer on which carbon nanotubes were deposited, there is an advantage of being able to process the electrode into various forms.

Finally, as shown in FIG. 2d, the semi-cured conductive polymer layer 35' was heat treated to form a completely cured conductive polymer layer 35". Although the temperature for heat treatment in this process varies depending on the kinds of the polymers used, heat treatment may be performed at a temperature of about 150 to about 200° C., similar to the above-mentioned curing conditions.

Further, in accordance with this embodiment, the cured conductive polymer layer 35" can reinforce deposition states of carbon nanotubes 33, and also increase contact area between carbon nanotubes 33 and electrodes. In addition, in this embodiment, it is possible to fabricate the carbon nanotube emitter electrode by separating the polymer layer only, without using the substrate, as described above, and thus higher processability can be obtained. Also, when performing the deposition process of carbon nanotubes by electrophoresis, the conductive polymer has very low conductivity as compared to copper that is the conventional electrode material, and therefore it may serve as a resistance layer, thus realizing more uniform deposition of carbon nanotubes.

The process for fabricating the field emitter electrode in accordance with the present invention will now be described in more detail by way of the following example.

EXAMPLE

First, a substrate was acid-cleaned with a solution of 10% sulfuric acid for 10 min and then washed with deionized water to provide a clean surface substrate.

To the substrate was applied poly(3,4-ethylenedioxythiophene) (Baytron P, Bayer) as a conductive polymer, followed by spin coating at 600 rpm to a thickness of about 0.75 µm. Then, in order to semi-cure the applied conductive polymer, it was heat treated at a temperature of about 50° C. for 10 min to form a non-flowable conductive polymer layer.

Next, in order to carry out a deposition process of carbon nanotubes by electrophoresis, 30 mg of multi-wall carbon nanotubes prepared by CVD, and 60 mg of benzene konium chloride as a cationic dispersing agent were mixed in deionized water to prepare an electrolyte. The electrolyte thus obtained was subjected to ultrasonic waves for about 1 hour so as to more homogeneously disperse carbon nanotubes in the electrolyte.

Next, the anode and cathode were connected to a power supply and impregnated in the electrolyte, the substrate having the conductive polymer layer formed thereon was mounted on the anode and then a predetermined voltage was applied to both electrodes so as to deposit carbon nanotubes on the conductive polymer layer.

Finally, the substrate was recovered and additionally heat treated for 30 min at a temperature of about 180° C. so as to completely cure the semi-cured conductive polymer layer, thus completing formation of the desired carbon nanotube emitter electrode.

Figure 4A:
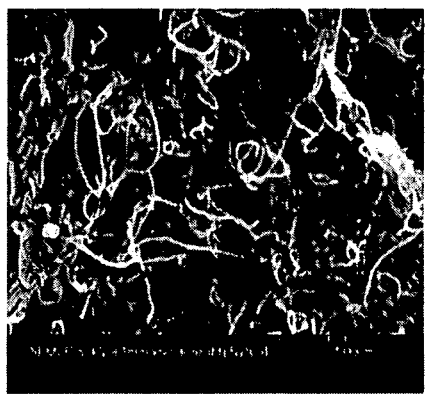
FIGS. 4a and 4b are SEMs of a carbon nanotube emitter electrode prepared in accordance with the present invention and light emitting states thereof, respectively.
Figure 4B:
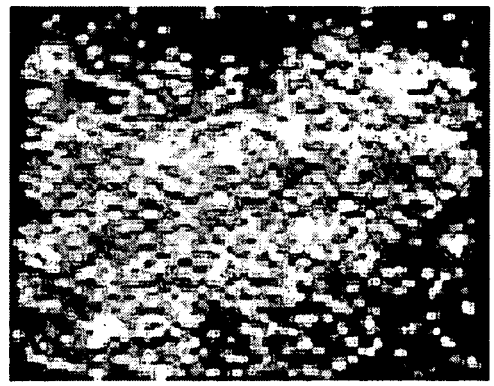

FIGS. 4a and 4b are SEMs of a carbon nanotube emitter electrode prepared in accordance with this example and light emitting states thereof, respectively. As can be confirmed from FIG. 4a, carbon nanotubes were uniformly dispersed and formed inside of the conductive polymer layer. And also, as can be confirmed from FIG. 4b, when used in the field emission device, the carbon nanotube emitter electrode exhibited excellent light emitting states.

As apparent from the above description, the present invention can realize improvement of bond strength of carbon nanotubes, and also improvement of electrical characteristics of the electrode due to increased electrical contact area between carbon nanotubes and electrodes, by providing the cured conductive polymer layer.

Further, when the conductive polymer layer is formed first, it is possible to prepare the conductive polymer layer having carbon nanotubes deposited thereon, without using a substrate, thus providing high processability and thereby it is applicable to various forms of field emission devices such as a rod-like structure. And also, when performing the deposition process of carbon nanotubes by electrophoresis, the conductive polymer layer has very low conductivity as compared to copper that is the conventional electrode material, and therefore it may serve as a resistance layer, thus realizing more uniform deposition of carbon nanotubes.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A process for fabricating a field emitter electrode, comprising the steps of:
applying a conductive polymer onto a substrate;
semi-curing the conductive polymer such that the applied conductive polymer forms a non-flowable polymer layer maintainable on the substrate;
separating the non-flowable conductive polymer layer from the substrate;
depositing carbon nanotubes on the non-flowable conductive polymer layer by electrophoresis: and
heat treating the conductive polymer having carbon nanotubes deposited thereon, so as to completely cure it;
wherein the step of depositing carbon nanotubes includes connecting the conductive polymer layer to either of two electrodes, impregnating it with a cathode in an electrolyte containing carbon nanotubes dispersed therein and applying a predetermined voltage to both electrodes so as to deposit carbon nanotubes on the conductive polymer layer.

2. The process as set forth in claim 1, wherein the carbon nanotubes have a length of 1 to 2 μm.

3. The process as set forth in claim 1, wherein the applied conductive polymer layer has a thickness of 0.5 to 2 μm.

4. The process as set forth in claim 1, wherein the conductive polymer is selected from the group consisting of polypyrrol, polyaniline, poly(3,4-ethylenedioxythiophene), polyacetylene, poly(p-phenylene), polythiophene, poly(p-phenylenevinylene) and poly(thienylene vinylene).

5. The process as set forth in claim 1, wherein the step of applying the conductive polymer is performed by a process selected from the group consisting of spin coating, spray coating, screen printing and ink jet printing.

6. The process as set forth in claim 1, wherein a dispersing agent is additionally added to the electrolyte in which carbon nanotubes were dispersed.

7. The process as set forth in claim 6, wherein the dispersing agent is at least one cationic dispersing agent selected from benzene konium chloride, polyethyleneimine and magnesium chloride ($MgCl_2$), or sodium dodecyl sulfate.

8. The process as set forth in claim 7, wherein the dispersing agent is added in an amount of about 100 wt % to about 500 wt % relative to the amount of carbon nanotubes.

9. The process as set forth in claim 1, further comprising:
homogeneously dispersing the electrolyte in which carbon nanotubes were dispersed, using ultrasonic waves, prior to the step of depositing carbon nanotubes.

10. A process for fabricating a field emitter electrode, comprising the steps of:
applying a conductive polymer onto a substrate;
semi-curing the conductive polymer such that the applied conductive polymer forms a non-flowable polymer layer maintainable on the substrate;
depositing carbon nanotubes on the non-flowable conductive polymer layer by electrophoresis; and
heat treating the conductive polymer having carbon nanotubes deposited thereon, so as to completely cure it;
wherein the step of semi-curing the conductive polymer includes heat treating the conductive polymer at a temperature of 50 to 100° C. for 5 to 30 min.

11. The process as set forth in claim 10, wherein the carbon nanotubes have a length of 1 to 2 μm.

12. The process as set forth in claim 10, wherein the applied conductive polymer layer has a thickness of 0.5 to 2 μm.

13. The process as set forth in claim 10, wherein the conductive polymer is selected from the group consisting of polypyrrol, polyaniline, poly(3,4-ethylenedioxythiophene), ethylenedioxythiophene), polyacetylene, poly(p-phenylene), polythiophene, poly(p-phenylenevinylene) and poly(thienylene vinylene).

14. The process as set forth in claim 10, wherein the step of applying the conductive polymer is performed by a process selected from the group consisting of spin coating, spray coating, screen printing and ink jet printing.

15. The process as set forth in claim 10, wherein the step of depositing carbon nanotubes includes connecting the conductive polymer layer to either of both electrodes, impregnating it with a cathode in an electrolyte containing carbon nanotubes dispersed therein and applying a predetermined voltage to both electrodes so as to deposit carbon nanotubes on the conductive polymer layer.

16. The process as set forth in claim 15, wherein a dispersing agent is additionally added to the electrolyte in which carbon nanotubes were dispersed.

17. The process as set forth in claim 16, wherein the dispersing agent is at least one cationic dispersing agent selected from benzene konium chloride, polyethyleneimine and magnesium chloride ($MgCl_2$), or sodium dodecyl sulfate.

18. The process as set forth in claim 17, wherein the dispersing agent is added in an amount of about 100 wt % to about 500 wt % relative to the amount of carbon nanotubes.

19. The process as set forth in claim 15, further comprising:
homogeneously dispersing the electrolyte in which carbon nanotubes were dispersed, using ultrasonic waves, prior to the step of depositing carbon nanotubes.

* * * * *